United States Patent
Abe et al.

(10) Patent No.: US 6,380,337 B2
(45) Date of Patent: Apr. 30, 2002

(54) FLUOROELASTOMER, PRODUCTION THEREOF, CROSSLINKABLE COMPOSITION AND CURING PRODUCT

(75) Inventors: Katsumi Abe, Chigasaki; Haruyoshi Tatsu, Hitachi, both of (JP)

(73) Assignee: Nippon Mektron, Ltd., Tokyo (JP)

( * ) Notice: Subject to any disclaimer, the term of this patent is extended or adjusted under 35 U.S.C. 154(b) by 0 days.

(21) Appl. No.: 09/745,097

(22) Filed: Dec. 20, 2000

(30) Foreign Application Priority Data

Dec. 22, 1999 (JP) .......................................... 11-364885

(51) Int. Cl.$^7$ ..................... C08F 214/22; C08F 214/26; C08F 214/18
(52) U.S. Cl. ..................... 526/255; 526/206; 526/247; 526/249; 526/250
(58) Field of Search ................................ 526/255, 247, 526/250, 249, 206

(56) References Cited

U.S. PATENT DOCUMENTS

| | | |
|---|---|---|
| 4,035,565 A | 7/1977 | Apotheker et al. |
| 4,158,678 A | 6/1979 | Tatemoto et al. |
| 4,564,662 A | 1/1986 | Albin |
| 4,745,165 A | 5/1988 | Arcella et al. |
| 6,150,485 A * | 11/2000 | Saito ........................... 526/296 |
| 6,160,051 A * | 12/2000 | Tatsu ........................... 525/90 |

FOREIGN PATENT DOCUMENTS

| | | |
|---|---|---|
| JP | 54(1979)-1585 | 1/1979 |
| JP | 58(1983)-4728 | 1/1983 |

* cited by examiner

*Primary Examiner*—Fred Zitomer
(74) *Attorney, Agent, or Firm*—Webb Ziesenheim Logsdon Orkin & Hanson, P.C.

(57) ABSTRACT

A fluoroelastomer comprising constituent units derived from vinylidene fluoride (a) and constituent units derived from perfluoro(methoxypropyl vinyl ether) (b), optionally together with constituent units derived from tetrafluoroethylene (c) and/or constituent units derived from a perfluoroalkyl vinyl ether (d), wherein the constituent units (a) are contained in an amount of 65 to 85 mol %, the constituent units (b) in an amount of 0.5 to 30 mol %, the constituent units (c) in an amount of 0 to 10 mol % and the constituent units (d) in an amount of 0 to 25 mol %. The fluoroelastomer can be produced by a process comprising copolymerizing vinylidene fluoride and perfluoro(methoxypropyl vinyl ether), optionally together with tetrafluoroethylene and/or a perfluoroalkyl vinyl ether, in the presence of an iodated brominated compound represented by the general formula $RBr_nI_m$ [I]. Further, there is provided a crosslinkable composition comprising the above fluoroelastomer and a peroxide crosslinking agent. Still further, there is provided a curing product produced by curing the above crosslinkable composition, and having excellent resistances to heat, cold and solvents.

15 Claims, 1 Drawing Sheet

FLUOROELASTOMER, PRODUCTION THEREOF, CROSSLINKABLE COMPOSITION AND CURING PRODUCT

FIELD OF THE INVENTION

The present invention relates to a fluoroelastomer, a process for producing the fluoroelastomer, a crosslinkable composition containing the fluoroelastomer and a curing product from the crosslinkable composition.

BACKGROUND OF THE INVENTION

Properties such as resistances to heat, cold and solvents (including fuel oil and other oils) are required for molded items such as oil seals and fuel hoses for automobiles, aircrafts, etc. Thus, there is a demand for the development of resin materials which possess these properties in desirable balance.

For example, Japanese Patent Publication No. 54(1979)-1585 describes a fluorinated polymer composition comprising an organic peroxide and a fluorinated polymer obtained by copolymerization with an olefin containing 3 mol % or less of bromine. However, the product of peroxide crosslinking obtained from this composition, although exhibiting cold resistance to a certain extent, has a drawback in that the solvent resistance is poor.

On the other hand, Japanese Patent Publication No. 58(1983)-4728 describes a fluorinated multisegmented polymer obtained by copolymerization with the use of an iodated compound as a chain transfer agent. However, because the iodated compound used as a chain transfer agent has a small molecular weight, there is a problem that an improvement of cold resistance cannot be expected at all.

The inventors have made extensive and intensive studies with a view to solve the above problems of the prior art. As a result, it has been found that, when use is made of a crosslinkable composition containing a specified fluoroelastomer, there can be obtained a curing product which is excellent in resistances to heat, cold and solvents. The present invention has been accomplished on the basis of this finding.

An object of the present invention is to solve the above problems of the prior art. Specifically, objects of the present invention are to provide a fluoroelastomer from which a curing product excellent in resistances to heat, cold and solvents, can be obtained and to provide a crosslinkable composition containing the same and a curing product therefrom.

SUMMARY OF THE INVENTION

The fluoroelastomer of the present invention comprises:
constituent units derived from vinylidene fluoride (a), and
constituent units derived from perfluoro(methoxypropyl vinyl ether) (b),
optionally together with constituent units derived from tetrafluoroethylene (c) and/or constituent units derived from a perfluoroalkyl vinyl ether (d),
wherein:
the constituent units (a) are contained in an amount of 65 to 85 mol %,
the constituent units (b) are contained in an amount of 0.5 to 30 mol %,
the constituent units (c) are contained in an amount of 0 to 10 mol %, and
the constituent units (d) are contained in an amount of 0 to 25 mol %.

It is preferred that the constituent units (b) be contained in an amount of 6 to 25 mol %.

The fluoroelastomer of the present invention may further comprise constituent units (e) derived from a brominated compound, iodated compound or iodated brominated compound represented by the general formula:

$$RBr_nI_m \qquad [I]$$

wherein R represents any of a fluorohydrocarbon group, a chlorofluorohydrocarbon group, a chlorohydrocarbon group and a hydrocarbon group, these groups optionally having a functional group X, X representing —O—, —S—, =NR, —COOH, —SO$_2$, —SO$_3$H or —PO$_3$H; and each of n and m is 0, 1 or 2.

The above constituent units (e) are preferably contained in an amount of 0.001 to 5 parts by weight per 100 parts by weight of the sum of the constituent units (a), (b), (c) and (d).

The process for producing a fluoroelastomer according to the present invention comprises copolymerizing vinylidene fluoride and perfluoro(methoxypropyl vinyl ether), optionally together with tetrafluoroethylene and/or a perfluoroalkyl vinyl ether, in the presence of a compound represented by the general formula:

$$RBr_nI_m \qquad [I]$$

wherein R represents any of a fluorohydrocarbon group, a chlorofluorohydrocarbon group, a chlorohydrocarbon group and a hydrocarbon group, these groups optionally having a functional group X, X representing —O—, —S—, =NR, —COOH, —SO$_2$, —SO$_3$H or —PO$_3$H; and each of n and m is 0, 1 or 2.

The crosslinkable composition of the present invention comprises the above fluoroelastomer and a peroxide crosslinking agent. The curing product of the present invention is produced by curing this crosslinkable composition.

DETAILED DESCRIPTION OF THE INVENTION

Figure 1:
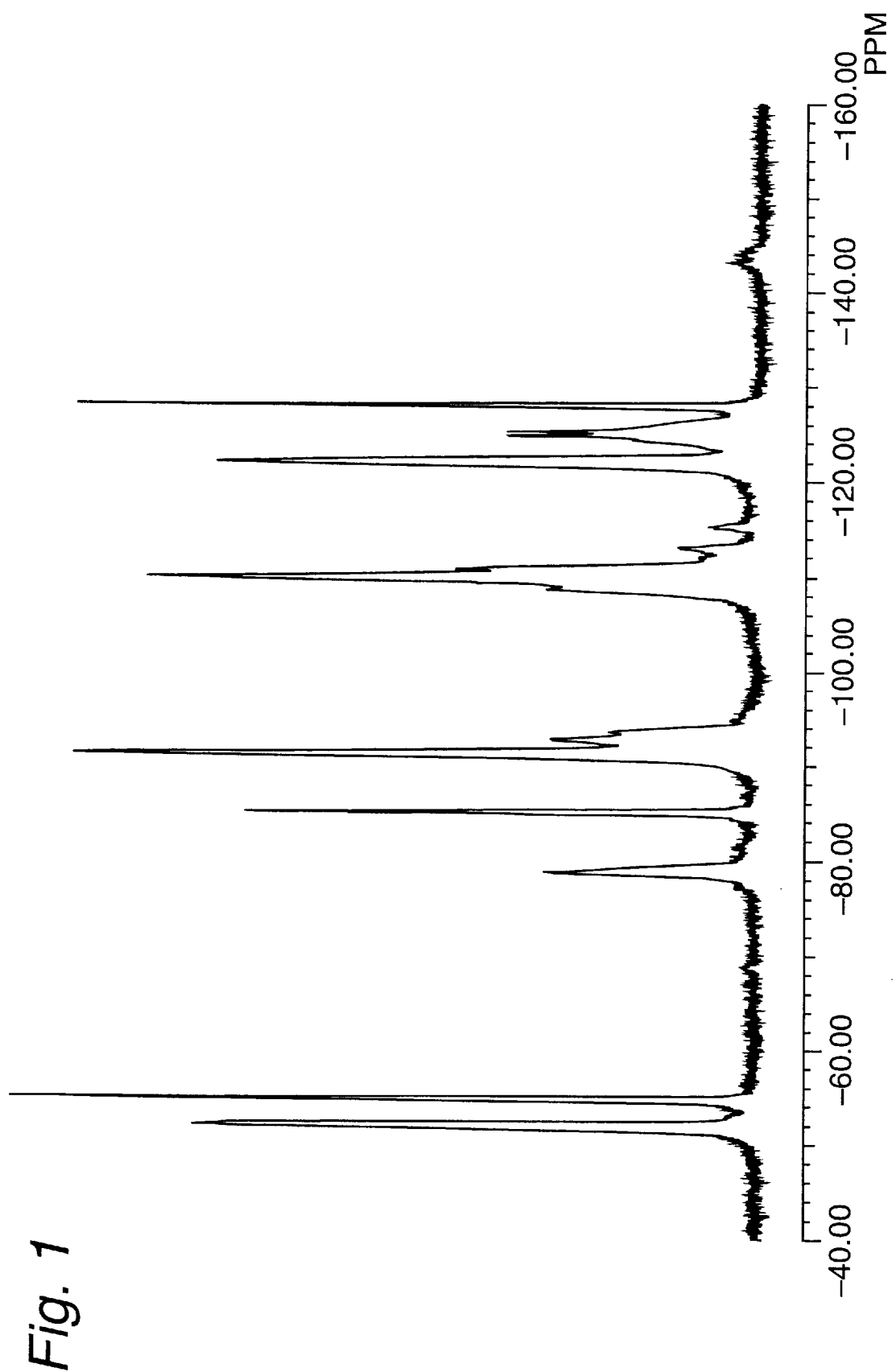
FIG. 1 is a chart of $^{19}$F-NMR spectrum of the fluoroelastomer obtained in Example 1.

The fluoroelastomer, process for producing the same, the crosslinkable composition and the curing product therefrom according to the present invention will be described in detail below.

Fluoroelastomer

The fluoroelastomer of the present invention is a copolymer comprising constituent units derived from vinylidene fluoride (a) and constituent units derived from perfluoro (methoxypropyl vinyl ether) (b), optionally together with constituent units derived from tetrafluoroethylene (c) and/or constituent units derived from a perfluoroalkyl vinyl ether (d).

Vinylidene fluoride from which the constituent units (a) can be derived, perfluoro(methoxypropyl vinyl ether) [CF$_2$=CFOCF$_2$CF$_2$OCF$_3$] from which the constituent units (b) can be derived and tetrafluoroethylene from which the constituent units (c) can be derived can be produced by known processes. These are also commercially available.

The perfluoroalkyl vinyl ether from which the constituent units (d) according to the present invention can be derived may be, for example, any of perfluoro(methyl vinyl ether), perfluoro(ethyl vinyl ether) and perfluoro(propyl vinyl ether). Of these, perfluoro(methyl vinyl ether) is preferably employed. These perfluoroalkyl vinyl ethers can be produced by known processes and are also commercially available.

The fluoroelastomer may further comprise constituent units (e) derived from a brominated compound, iodated compound or iodated brominated compound represented by the general formula:

$$RBr_nI_m \quad [I]$$

wherein R represents any of a fluorohydrocarbon group, a chlorofluorohydrocarbon group, a chlorohydrocarbon group and a hydrocarbon group, and each of n and m is 0, 1 or 2.

These compounds are not limited as long as chain transfer and other effects are not lost by any side reactions under conditions of polymerization. For example, the group R is generally selected from among fluorohydrocarbon groups, chlorofluorohydrocarbon groups, chlorohydrocarbon groups and hydrocarbon groups each having 1 to 10 carbon atoms. All the groups may have a functional group, such as —O—, —S—, =NR, —COOH, —SO$_2$, —SO$_3$H or —PO$_3$H, bonded thereto.

The compound represented by the general formula [I] can be a brominated compound, an iodated compound or an iodated brominated compound.

The brominated compound may be, for example, any of brominated vinyl compounds and brominated olefins, such as vinyl bromide, 1-bromo-2,2-difluoroethylene, perfluoroallyl bromide, 4-bromo-1,1,2-trifluorobutene, 4-bromo-3,3,4,4-tetrafluorobutene, 4-bromo-1,1,3,3,4,4-hexafluorobutene, bromotrifluoroethylene, 4-bromo-3-chloro-1,1,3,4,4-pentafluorobutene, 6-bromo-5,5,6,6-tetrafluorohexene, 4-bromoperfluorobutene-1 and 3,3-difluoroallyl bromide.

Among the iodated brominated compounds represented by the general formula [I], saturated or unsaturated aliphatic or aromatic iodated brominated compounds wherein n and m are simultaneously 1 are preferably employed. When one of n and m is 2, formed fluoroelastomer has a three-dimensional structure. Therefore, such a compound is preferably used in such an amount that any processability deterioration would not be caused.

The iodated brominated chain compound of the general formula [I] can be, for example, any of 1-bromo-2-iodoperfluoroethane, 1-bromo-3-iodoperfluoropropane, 1-bromo-4-iodoperfluorobutane, 2-bromo-3-iodoperfluorobutane, 1-bromo-2-iodoperfluoro(2-methylpropane), monobromomonoiodoperfluorocyclobutane, monobromomonoiodoperfluoropentane, monobromomonoiodoperfluoro-n-octane, monobromomonoiodoperfluorocyclohexane, 1-bromo-1-iodo-2-chloroperfluoroethane, 1-bromo-2-iodo-2-chloroperfluoroethane, 1-iodo-2-bromo-2-chloroperfluoroethane, 1,1-dibromo-2-iodoperfluoroethane, 1,2-dibromo-2-iodoperfluoroethane, 1,2-diiodo-2-bromoperfluoroethane, 1-bromo-2-iodo-1,2,2-trifluoroethane, 1-iodo-2-bromo-1,2,2-trifluoroethane, 1-bromo-2-iodo-1,1-difluoroethane, 1-iodo-2-bromo-1,1-difluoroethane, 1-bromo-2-iodo-1-fluoroethane, 1-iodo-2-bromo-1-fluoroethane, 1-bromo-2 -iodo-1,1,3,3,3-pentafluoropropane, 1-iodo-2-bromo-1,1,3,3,3-pentafluoropropane, 1-bromo-2-iodo-3,3,4,4,4-pentafluorobutane, 1-iodo-2-bromo-3,3,4,4,4-pentafluorobutane, 1,4-dibromo-2-iodoperfluorobutane, 2,4-dibromo-1-iodoperfluorobutane, 1,4-diiodo-2-bromoperfluorobutane, 1,4-dibromo-2-iodo-3,3,4,4-tetrafluorobutane, 1,4-diiodo-2-bromo-3,3,4,4-tetrafluorobutane, 1,1-dibromo-2,4-diiodoperfluorobutane, 1-bromo-2-iodo-1-chloroethane, 1-iodo-2-bromo-1-chloroethane, 1-bromo-2-iodo-2-chloroethane, 1-bromo-2-iodo-1,1-dichloroethane, 1,3-dibromo-2-iodoperfluoropropane, 2,3-dibromo-2-iodoperfluoropropane, 1,3-diiodo-2-bromoperfluoropropane, 1-bromo-2-iodoethane, 1-bromo-2-iodopropane, 1-iodo-2-bromopropane, 1-bromo-2-iodobutane, 1-iodo-2-bromobutane, 1-bromo-2-iodo-2-trifluoromethyl-3,3,3-trifluoropropane, 1-iodo-2-bromo-2-trifluoromethyl-3,3,3-trifluoropropane, 1-bromo-2-iodo-2-phenylperfluoroethane, 1-iodo-2-bromo-2-phenylperfluoroethane, 3-bromo-4-iodoperfluorobutene-1, 3-iodo-4-bromoperfluorobutene-1, 1-bromo-4-iodoperfluorobutene-1, 1-iodo-4-bromoperfluorobutene-1, 3-bromo-4-iodo-3,4,4-trifluorobutene-1, 4-bromo-3-iodo-3,4,4-trifluorobutene-1, 3-bromo-4-iodo-1,1,2-trifluorobutene-1, 4-bromo-5-iodoperfluoropentene-1, 4-iodo-5-bromoperfluoropentene-1, 4-bromo-5-iodo-1,1,2-trifluoropentene-1, 4-iodo-5-bromo-1,1,2-trifluoropentene-1, 1-bromo-2-iodoperfluoroethyl perfluoromethyl ether, 1-bromo-2-iodoperfluoroethyl perfluoroethyl ether, 1-bromo-2-iodoperfluoroethyl perfluoropropyl ether, 2-bromo-3-iodoperfluoropropyl perfluorovinyl ether, 1-bromo-2-iodoperfluoroethyl perfluorovinyl ether, 1-bromo-2-iodoperfluoroethyl perfluoroallyl ether, 1-bromo-2-iodoperfluoroethyl methyl ether, 1-iodo-2-bromoperfluoroethyl ethyl ether, 1-iodo-2-bromoethyl ethyl ether and 1-bromo-2-iodoethyl 2'-chloroethyl ether. These iodated brominated compounds can be produced by appropriate known processes. For example, fluorinated monobromomonoiodoolefins can be obtained by reacting iodine bromide with fluorinated olefins.

The aromatic iodated brominated compound among the iodated brominated compounds can be, for example, any of substituted benzenes such as 1-iodo-2-bromo-, 1-iodo-3-bromo-, 1-iodo-4-bromo-, 3,5-dibromo-1-iodo-, 3,5-diiodo-1-bromo-, 1-(2-iodoethyl)-4-(2-bromoethyl)-, 1-(2-iodoethyl)-3-(2-bromoethyl)-, 1-(2-iodoethyl)-4-(2-bromoethyl)-, 3,5-bis(2-bromoethyl)-1-(2-iodoethyl)-, 3,5-bis(2-iodoethyl)-1-(2-bromoethyl)-, 1-(3-iodopropyl)-2-(3-bromopropyl)-, 1-(3-iodopropyl)-3-(3-bromopropyl)-, 1-(3-iodopropyl)-4-(3-bromopropyl)-, 3,5-bis(3-bromopropyl)-1-(3-iodopropyl)-, 1-(4-iodobutyl)-3-(4-bromobutyl)-, 1-(4-iodobutyl)-4-(4-bromobutyl)-, 3,5-bis(4-iodobutyl)-1-(4-bromobutyl)-, 1-(2-iodoethyl)-3-(3-bromopropyl)-, 1-(3-iodopropyl)-3-(4-bromobutyl)-, 3,5-bis(3-bromopropyl)-1-(2-iodoethyl)-, 1-iodo-3-(2-bromoethyl)-, 1-iodo-3-(3-bromopropyl)-, 1,3-diiodo-5-(2-bromoethyl)-, 1,3-diiodo-5-(3-bromopropyl)-, 1-bromo-3-(2-iodoethyl)-, 1-bromo-3-(3-iodopropyl)-, 1,3-dibromo-5-(2-iodoethyl)- and 1,3-dibromo-5-(3-iodopropyl)benzenes; and substituted perfluorobenzenes such as 1-iodo-2-bromo-, 1-iodo-3-bromo-, 1-iodo-4-bromo-, 3,5-dibromo-1-iodo- and 3,5-diiodo-1-bromoperfluorobenzenes.

The iodated compound can be, for example, any of 1,2-diiodotetrafluoroethane, 1,3-diiodohexafluoropropane, 1,4-diiodooctafluorobutane, iodoperfluoroethylene, iodo-1,1-difluoroethylene, iodoethylene, 2-iodoperfluoroethyl vinyl ether, 1,7-diiodoperfluoro-n-octane, 1,12-diiodoperfluorododecane, 1,16-diiodoperfluorohexadecane, 1,3-diiodo-2-chloroperfluoro-n-propane and 1,5-diiodo-2,4-dichloroperfluoro-n-pentane.

Furthermore, compounds of the general formula [I] wherein R has a functional group are also preferably employed.

As such compounds, there can be mentioned, for example, brominated vinyl ethers of the general formula [I] wherein n=1, m=0, and R is $R^1$—O—CF=$CF_2$ [$R^1$ representing a perfluoroalkyl group]. Examples of the brominated vinyl ethers include:

$CF_2BrCF_2OCF$=$CF_2$, $CF_2Br(CF_2)_2OCF$=$CF_2$, $CF_2Br(CF_2)_3OCF$=$CF_2$, $CF_3CFBr(CF_2)_2OCF$=$CF_2$, and $CF_2Br\ (CF_2)_4OCF$=$CF_2$.

These brominated vinyl ethers can be synthesized by known processes, for example, the process described in U.S. Pat. No. 4,745,165.

Also, use can be made of brominated vinyl ethers of the general formula [I] wherein n=1, m=0, and R is $R^2OCF$=$CFBr$ or $R^2OCBr$=$CF_2$ [$R^2$ representing a lower alkyl group or a fluoroalkyl group]. These brominated vinyl ethers can be synthesized by known processes, for example, the process described in U.S. Pat. No. 4,564,662.

The brominated compound, iodated brominated compound or iodated compound according to the present invention acts as a chain transfer agent for forming crosslink sites in the copolymer and regulates the molecular weight of the copolymer to thereby enable to enhance the processability of the crosslinkable composition.

With respect to the above compounds, for example, the iodated brominated compound, it is presumed that, at the time of polymerization, the formation of organic peroxide radicals induces easy radical cleavage of iodine and bromine from the iodated brominated compound, monomer additive propagation reaction is realized by the high reactivity of thus generated radicals, and thereafter the reaction is terminated by abstraction of iodine and bromine from the iodated brominated compound, with the result that the fluoroelastomer having iodine and bromine bonded to molecular terminals thereof, can be provided. The iodine and bromine atoms bonded to the molecular terminals of the fluoroelastomer act as crosslink sites at the time of peroxide curing.

In the fluoroelastomer of the present invention, vinylidene fluoride from which the constituent units (a) are derived is used in an amount of 65 to 85 mol %, preferably 70 to 80 mol %. When the amount of vinylidene fluoride is smaller than 65 mol % in the copolymerization, the curing product from the crosslinkable composition containing the fluoroelastomer may suffer deterioration of low-temperature properties. On the other hand, when the amount exceeds 85 mol %, the curing product from the crosslinkable composition containing the fluoroelastomer may suffer deterioration of resistances to solvents and chemicals.

Perfluoro(methoxypropyl vinyl ether) from which the constituent units (b) according to the present invention are derived is used in an amount of 0.5 to 30 mol %, preferably 6 to 25 mol %, and still preferably 8 to 20 mol %. The use of perfluoro(methoxypropyl vinyl ether) in the above amount in the copolymerization is preferred not only from the viewpoint that there can be obtained a curing product of crosslinkable composition containing fluoroelastomer with excellent low-temperature properties but also from the economic viewpoint.

Tetrafluoroethylene from which the constituent units (c) optionally contained in the present invention are derived is used in an amount of 0 to 10 mol %, preferably 4 to 8 mol %. When the amount of tetrafluoroethylene exceeds 10 mol % in the copolymerization, the curing product from the crosslinkable composition containing the fluoroelastomer may suffer from deterioration of low-temperature properties.

Perfluoroalkyl vinyl ether from which the constituent units (d) optionally contained in the present invention are derived is used in an amount of 0 to 25 mol %, preferably 5 to 15 mol %.

Moreover, the total usage of monomers from which these constituent units (a), (b), (c) and (d) are derived is 100 mol %.

When the compound of the general formula [I] is used, it is preferably added in an amount of 0.001 to 5% by weight, still preferably 0.01 to 3% by weight, based on the total of vinylidene fluoride and perfluoro(methoxypropyl vinyl ether), optionally together with tetrafluoroethylene and/or perfluoroalkyl vinyl ether. When the amount of the compound is in the above ranges, a curing product exhibiting not only excellent compression permanent set characteristics but also excellent elongation ratio can be obtained.

Copolymerization Reaction

The fluoroelastomer of the present invention is obtained by copolymerizing the vinylidene fluoride and the perfluoro (methoxypropyl vinyl ether), optionally together with the tetrafluoroethylene and/or the perfluoroalkyl vinyl ether.

The copolymerization of the present invention can optionally be performed in the presence of a compound selected from a brominated compound, an iodated brominated compound and an iodated compound.

The copolymerization of the present invention can generally be performed by the emulsion polymerization technique wherein the reaction is effected in a water- base medium in the presence of a water-soluble peroxide catalyst, preferably a redox catalyst thereof. The copolymerization can also be performed by the radical solution polymerization technique in which use is made of a fluorinated solvent.

The polymerization according to the emulsion polymerization technique will hereinafter be described.

For example, persulfate salts such as ammonium persulfate, potassium persulfate and sodium persulfate are preferably used as the above water-soluble peroxide catalyst in the emulsion polymerization.

As an agent for effecting emulsification, use can be made of, for example, fluorinated emulsifiers such as fluorinated aliphatic carboxylates and fluorinated alcohol phosphates or sulfates, or common emulsifiers such as higher aliphatic alcohol sulfates and aromatic sulfonates. These water-soluble emulsifiers can be used either individually or in combination.

It is preferred that each emulsifier be used in an amount of about 0.001 to 10% by weight, especially about 0.01 to 5% by weight, based on the water-base medium.

The emulsion polymerization in the presence of the above water-soluble peroxide catalyst and emulsifier is carried out at about 0 to 80° C., preferably about 20 to 60° C. When the reaction temperature exceeds 80° C., the formed copolymer may have an unfavorably low molecular weight. Further, the decomposition rate of polymerization catalyst may become so high as to incur an efficiency lowering. On the other hand, when the reaction temperature is lower than 0° C., the polymerization rate may become too low to realize practical operation. With respect to the polymerization pressure, the higher, the more desirable, as long as the copolymer of homogeneous composition can be obtained. Generally, however, the employed pressure is about 100 kg/cm$^2$G or below.

Although the molecular weight of the fluoroelastomer obtained as the copolymer according to the present invention is not particularly limited, it is generally preferred that, for example, the number average molecular weight (Mn, measured by GPC in a solvent of THF) be in the range of 10,000 to 1,000,000, especially 50,000 to 300,000. The solution viscosity, $\eta_{sp}/C$ (at 35° C. in methyl ethyl ketone), as an index of molecular weight is preferably in the range of 0.1 to 5 dl/g, still preferably 0.5 to 3.5 dl/g.

In the present invention, the molecular weight of obtained fluoroelastomer can be regulated by adding a chain transfer agent, such as methanol, ethanol, isopentane, diethyl malonate or carbon tetrachloride, at the time of polymerization for obtaining the copolymer, if necessary.

The fluoroelastomer thus obtained is a copolymer comprising:

constituent units derived from vinylidene fluoride (a), and constituent units derived from perfluoro(methoxypropyl vinyl ether) (b), optionally together with constituent units derived from tetrafluoroethylene (c) and/or constituent units derived from a perfluoroalkyl vinyl ether (d), wherein:

the constituent units (a) are contained in an amount of 65 to 85 mol %, preferably 70 to 80 mol %, the constituent units (b) are contained in an amount of 0.5 to 30 mol %, preferably 6 to 25 mol %, and still preferably 8 to 20 mol %, the constituent units (c) are contained in an amount of 0 to 10 mol %, preferably 4 to 8 mol %, and the constituent units (d) are contained in an amount of 0 to 25 mol %, preferably 5 to 15 mol % (provided that (a)+(b)+(c)+(d)=100 mol %).

When this fluoroelastomer further comprises the compound represented by the general formula $RBr_nI_m$ (wherein R represents any of a fluorohydrocarbon group, a chlorofluorohydrocarbon group, a chlorohydrocarbon group and a hydrocarbon group, and each of n and m is 0, 1 or 2), it is preferred that the above constituent units (e) be contained in an amount of 0.001 to 5 parts by weight, especially 0.1 to 3 parts by weight, per 100 parts by weight of the sum of the constituent units (a), (b) , (c) and (d).

Crosslinkable Composition and Curing Product

The crosslinkable composition of the present invention comprises the above fluoroelastomer and a peroxide crosslinking agent.

The fluoroelastomer-containing crosslinkable composition of the present invention can be cured by various conventional vulcanization methods, for example, the peroxide vulcanization method using an organic peroxide, the polyamine vulcanization method using a polyamine compound, the polyol vulcanization method using a polyhydroxy compound and the irradiation method using radiation or electron beams. Of these, the peroxide vulcanization method is especially preferably employed because the crosslinkable composition upon being cured is excellent in mechanical strength and forms carbon-carbon bonds ensuring stable crosslink point structure to thereby provide a composition which is excellent in resistances to chemicals, wear and solvents.

The organic peroxide for use in the peroxide vulcanization method can be, for example, any of 2,5-dimethyl-2,5-bis(tert-butylperoxy)hexane, 2,5-dimethyl-2,5-bis(tert-butylperoxy)hexane-3, benzoyl peroxide, bis(2,4-dichlorobenzoyl) peroxide, dicumyl peroxide, di-tert-butyl peroxide, tert-butyl cumyl peroxide, tert-butylperoxybenzene, 1,1-bis(tert-butylperoxy)-3,5,5-trimethylcyclohexane, 2,5-dimethylhexane-2,5-dihydroxy peroxide, α,α'-bis(tert-butylperoxy)-p-diisopropylbenzene, 2,5-dimethyl-2,5-di(benzoylperoxy)hexane and tert-butylperoxyisopropyl carbonate.

In the peroxide vulcanization method using these organic peroxides, as a co-crosslinking agent, there can simultaneously be employed a polyfunctional unsaturated compound such as tri(meth)allyl isocyanurate, tri(meth)allyl cyanurate, triallyl trimellitate, N,N'-m-phenylenebismaleimide, diallyl phthalate, tris (diallylamino)-s-triazine, triallyl phosphite, 1,2-polybutadiene, ethylene glycol diacrylate or diethylene glycol diacrylate. The simultaneous use of this co-crosslinking agent enables the obtaining of a crosslinkable composition which is excellent in vulcanization characteristics, mechanical strength and compression permanent set characteristics.

If desired, the crosslinkable composition can be loaded with a bivalent metal oxide or hydroxide, such as an oxide or hydroxide of calcium, magnesium, lead, zinc or the like, as a crosslinking auxiliary. These compounds also act as an acid receptive agent.

With respect to the proportion of these components added to the peroxide vulcanization system, it is preferred that the organic peroxide be added in an amount of 0.1 to 10 parts by weight, especially about 0.5 to 5 parts by weight, optionally the co-crosslinking agent added in an amount of 0.1 to 10 parts by weight, especially about 0.5 to 5 parts by weight, and optionally the crosslinking auxiliary added in an amount of up to 15 parts by weight, especially 2 to 10 parts by weight, per 100 parts by weight of fluoroelastomer.

The crosslinkable composition of the present invention can be prepared by directly adding the above components to the fluoroelastomer and milling them. Alternatively, the above components can be diluted with carbon black, silica, clay, talc, diatom earth, barium sulfate or the like, or formed into a master batch dispersion with the fluoroelastomer. The crosslinkable composition can appropriately be loaded with conventional filler, reinforcing agent, plasticizer, lubricant, processing auxiliary, pigment, etc. in addition to the above components. When carbon black is used as the filler or reinforcing agent, carbon black is preferably added in an amount of about 10 to 50 parts by weight per 100 parts by weight of fluoroelastomer.

The curing of the crosslinkable composition can be accomplished by heating the same after the mixing of the components by common mixing methods such as the roll mixing, kneader mixing, banbury mixing and solution mixing methods. Generally, the heating thereof is preferably performed by press vulcanization at about 100 to 250° C. for about 1 to 120 min, or by oven vulcanization (post-cure) at about 150 to 300° C. for 0 to about 30 hr.

Curing product having excellent resistances to heat, cold and solvents can be obtained by the use of the fluoroelastomer and crosslinkable composition thereof according to the present invention.

EXAMPLE

The present invention will further be illustrated below with reference to the following Examples which in no way limit the scope of the invention.

Example 1

A 500 ml autoclave was charged with:

44 g (69.3 mol %) of vinylidene fluoride (VdF), 6 g (6.1 mol %) of tetrafluoroethylene (TFE), 24 g (14.6 mol %) of perfluoro(methyl vinyl ether) (FMVE) and 32 g (10.0 mol %) of perfluoro(methoxypropyl vinyl ether) (MPVE), 5 g of ammonium perfluorooctanoate, 0.54 g of $Na_2HPO_4 \cdot 12H_2O$, 0.02 g of $NaHSO_3$, 200 ml of water, and 1.0 g of $CF_2=CFOCF_2CF_2Br$.

The mixture was heated to 50° C., and 0.1 g of ammonium persulfate was added thereto to thereby initiate a polymerization. The reaction was performed for 8 hr, and the mixture was cooled to about 30° C. Unreacted gas was released, and the polymerization was terminated.

The obtained product was subjected to salting out with the use of a 2% aqueous solution of calcium chloride, and dried. Thus, there was obtained 100.6 g (polymerization ratio: 94.0%) of white fluoroelastomer.

The solution viscosity, $\eta_{sp}/C$ (at 35° C. in methyl ethyl ketone), of the fluoroelastomer was 3.06 dl/g.

$^{19}$F-NMR analysis showed that the composition of this fluoroelastomer was VdF/TFE/FMVE/MPVE=73.4/7.1/10.1/9.4 (molar ratio). The results are given in Table 1. The $^{19}$F-NMR spectrum is shown in FIG. 1.

Example 2 and Comparative Examples 1 and 2

Polymerization was carried out under the same conditions as in Example 1, except that the components were charged in the amounts specified in Table 1 in place of the recipe of Example 1. Thus, a fluoroelastomer was obtained. The results are given in Table 1.

The solution viscosity, $\eta_{sp}/C$ (at 35° C. in methyl ethyl ketone), of the fluoroelastomer obtained in Example 2 was 1.96 dl/g. The solution viscosity, $\eta_{sp}/C$ (at 35° C. in methyl ethyl ketone), of the fluoroelastomer obtained in Comparative Example 1 was 0.98 dl/g.

Examples 3 and 4 and Comparative Examples 3 and 4

100 parts by weight of each of the fluoroelastomers obtained in Examples 1 and 2 and Comparative Examples 1 and 2 was loaded with:

MT carbon black 30 parts by weight triallyl isocyanurate (60%) 7 parts by weight organic peroxide (Perhexa 2,5 B-40, produced by Nippon Yushi K.K.) 1.4 parts by weight zinc oxide (ZnO) 6 parts by weight.

The mixture was blended by means of a twin-roll mill and subjected first to press vulcanization at 180° C. for 10 min and thereafter to oven vulcanization (post-curing) at 230° C. for 22 hr.

With respect to the cured sheets thus obtained, there were measured the original-state properties (measured in accordance with DIN 53505, 53504), the heat resistance (heat aging resistance test at 230° C. for 70 hr), the cold resistance ($TR_{10}$ and $TR_{70}$) and the solvent resistance (ratio of volume change after immersion in methanol at 25° C. for 70 hr). The results are given in Table 2.

TABLE 1

|  | Example 1 | Example 2 | Comp. Ex. 1 | Comp. Ex. 2 |
|---|---|---|---|---|
| charged monomer wt. | | | | |
| VdF (g) | 44 | 50 | 41 | 44 |
| MPVE (g) | 32 | 70 | — | — |
| TFE (g) | 6 | — | 9 | — |
| FMVE (g) | 24 | — | 30 | 32 |
| charged monomer compsn. | | | | |
| VdF (mol %) | 69.3 | 78.2 | 70.0 | 78.0 |
| MPVE (mol %) | 10.0 | 21.8 | — | — |
| TFE (mol %) | 6.1 | — | 10.0 | — |
| FMVE (mol %) | 14.6 | — | 20.0 | 22.0 |
| formed fluoroelastomer compsn. | | | | |
| VdF (mol %) | 73.4 | 80.8 | 72.2 | 82.2 |
| MPVE (mol %) | 9.4 | 19.2 | — | — |
| TFE (mol %) | 7.1 | — | 10.0 | — |
| FMVE (mol %) | 10.1 | — | 17.8 | 17.8 |

TABLE 2

|  | Example 3 | Example 4 | Comp. Ex. 3 | Comp. Ex. 4 |
|---|---|---|---|---|
| fluoroelastomer as feedstock | Example 1 | Example 2 | Comp. Ex. 1 | Comp. Ex. 2 |
| original-state properties | | | | |
| hardness (Shore A) (pts) | 70 | 64 | 75 | 70 |
| tensile strength (MPa) | 14.6 | 9.7 | 18.4 | 18.0 |
| elongation (%) | 280 | 260 | 250 | 310 |
| heat aging resistance test | | | | |
| $A_H$ (pts) | 0 | +1 | 0 | 0 |
| $A_C$ (% $T_H$) | −6 | +1 | −7 | −8 |
| $A_C$ (% $E_H$) | −7 | +8 | +8 | +3 |
| cold resistance | | | | |
| $TR_{10}$ (° C.) | −36.3 | −42.4 | −30.9 | −32.4 |
| $TR_{70}$ (° C.) | −25.6 | −8.8 | −23.4 | −24.5 |
| solvent resistance methanol (%) | 31.6 | 21.7 | 79.6 | 153.5 |

What is claimed is:

1. A fluoroelastomer comprising monomer residues of:
   (a) 65 to 85 mol %, vinylidene fluoride,
   (b) 0.5 to 30 mol % perfluoro(methoxypropyl vinyl ether), optionally together with,
   (c) 0 to 10 mol %, tetrafluoroethylene, and/or
   (d) 0 to 25 mol %, of a perfluoroalkyl vinyl ether.

2. The fluoroelastomer as claimed in claim 1, wherein the constituent units (b) are contained in an amount of 6 to 25 mol %.

3. The fluoroelastomer as claimed in claim 1, further comprising (e) residues of a brominated compound, an iodated compound or an iodated brominated compound represented by the general formula:

$$RBr_nI_m \qquad [I]$$

wherein R represents any of a fluorohydrocarbon group, a chlorofluorohydrocarbon group, a chlorohydrocarbon group and a hydrocarbon group, these groups optionally having a functional group X, X representing —O—, —S—, =NR, —COOH, —SO$_2$, —SO$_3$H or —PO$_3$H; and each of n and m is 0, 1 or 2.

4. The fluoroelastomer as claimed in claim 3, wherein the constituent units (e) are contained in an amount of 0.001 to 5 parts by weight per 100 parts by weight of the sum of the constituent units (a), (b), (c) and (d).

5. A process for producing a fluoroelastomer, comprising copolymerizing vinylidene fluoride and perfluoro (methoxypropyl vinyl ether), optionally together with tetrafluoroethylene and/or a perfluoroalkyl vinyl ether, in the presence of a compound represented by the general formula:

$$RBr_nI_m \quad [I]$$

wherein R represents any of a fluorohydrocarbon group, a chlorofluorohydrocarbon group, a chlorohydrocarbon group and a hydrocarbon group, these groups optionally having a functional group X, X representing —O—, —S—, =NR, —COOH, —SO$_2$, —SO$_3$H or —PO$_3$H; and each of n and m is 0, 1 or 2.

6. A crosslinkable composition comprising the fluoroelastomer claimed in claim 1 and a peroxide crosslinking agent.

7. A curing product produced by curing the crosslinkable composition claimed in claim 6.

8. The fluoroelastomer as claimed in claim 2, further comprising:
(e) residues of a brominated compound, an iodated compound or an iodated brominated compound represented by the general formula:

$$RBr_nI_m \quad [I]$$

wherein R represents any of a fluorohydrocarbon group, a chlorofluorohydrocarbon group, a chlorohydrocarbon group and a hydrocarbon group, these groups optionally having a functional group X, X representing —O—, —S—, =NR, —COOH, —SO$_2$, —SO$_3$H or —PO$_3$H; and each of n and m is 0, 1 or 2.

9. The fluoroelastomer as claimed in claim 8, wherein the constituent units (e) are contained in an amount of 0.001 to 5 parts by weight per 100 parts by weight of the sum of the constituent units (a), (b), (c), and (d).

10. A crosslinkable composition comprising the fluoroelastomer claimed in claim 2 and a peroxide crosslinking agent.

11. A crosslinkable composition comprising the fluoroelastomer claimed in claim 4 and a peroxide crosslinking agent.

12. A crosslinkable composition comprising the fluoroelastomer claimed in claim 9 and a peroxide crosslinking agent.

13. A cured product produced by curing the crosslinkable composition claimed in claim 10.

14. A cured product produced by curing the crosslinkable composition claimed in claim 11.

15. A cured product produced by curing the crosslinkable composition claimed in claim 12.

* * * * *

UNITED STATES PATENT AND TRADEMARK OFFICE
CERTIFICATE OF CORRECTION

PATENT NO.     : 6,380,337 B2
DATED          : April 30, 2002
INVENTOR(S)    : Katsumi Abe et al.

It is certified that error appears in the above-identified patent and that said Letters Patent is hereby corrected as shown below:

Column 5,
Line 28, after "to thereby" delete "enable to".

Column 11,
Line 25, "A curing product" should read -- A cured product --.

Signed and Sealed this

First Day of October, 2002

Attest:

JAMES E. ROGAN
Attesting Officer            Director of the United States Patent and Trademark Office